United States Patent [19]

Wade

[11] 4,063,999
[45] Dec. 20, 1977

[54] NUCLEAR FUEL STORAGE ARRANGEMENT

[75] Inventor: Elman E. Wade, Ruffsdale, Pa.

[73] Assignee: Westinghouse Electric Corporation, Pittsburgh, Pa.

[21] Appl. No.: 653,176

[22] Filed: Jan. 28, 1976

[51] Int. Cl.² .................... G21C 19/00; G21C 19/20; G21C 3/30; G21F 5/00

[52] U.S. Cl. ........................... 176/28; 176/37; 176/76; 206/443; 250/507

[58] Field of Search ............... 176/27, 28, 30, 37, 176/76, 77, 78; 250/506, 507, 515, 518, 522, 496; 206/443, 535, 538, 820

[56] References Cited

U.S. PATENT DOCUMENTS

| | | | |
|---|---|---|---|
| 3,070,531 | 12/1962 | Huet | 176/28 |
| 3,180,799 | 4/1965 | Blake | 176/28 |
| 3,466,445 | 9/1969 | Schlies | 250/507 |
| 3,631,973 | 1/1972 | Rode | 206/443 |
| 3,680,690 | 8/1972 | Mills | 206/443 |
| 3,859,533 | 1/1975 | Suvanto | 250/507 |

*Primary Examiner*—Samuel W. Engle
*Assistant Examiner*—Donald P. Walsh
*Attorney, Agent, or Firm*—M. S. Yatsko

[57] ABSTRACT

An arrangement for the storage of nuclear reactor fuel assemblies having a section wherein fuel is present and a section wherein fuel is not present. The fuel assemblies are placed in a plurality of elongated cells which are joined together to form a cellular structure. The fuel assemblies are placed within the cells at different elevations so that the fuel containing section of one fuel assembly is next to the non-fuel-containing sections of each fuel assembly surrounding the first fuel assembly. The vertical staggering of the fuel containing sections achieves space reductions while maintaining the stored fuel in a subcritical assemblage.

12 Claims, 10 Drawing Figures

NUCLEAR FUEL STORAGE ARRANGEMENT

BACKGROUND OF THE INVENTION

This invention relates generally to nuclear reactors and more particularly to a storage arrangement for nuclear reactor fuel assemblies.

A nuclear reactor produces heat by the fissioning of a fissile material fuel. The fissile material is located within fuel elements, and a plurality of fuel elements are assembled into a fuel assembly. A plurality of fuel assemblies comprise a nuclear core.

During the course of reactor operations, the fuel will become depleted, or spent, and must be removed from the nuclear reactor. The spent fuel assemblies are generally removed during refueling operations, which typically occur approximately once a year. During the refueling operations, the spent fuel assemblies are removed from the reactor core, and new fuel assemblies are inserted into the reactor core. After being removed from the core, the spent fuel assemblies are generally placed in storage to await further disposition. The storage for the spent fuel containers is typically a separate fuel storage tank, although, in some reactor installations, the storage is within the nuclear reactor pressure vessel outside the core. In either location, the spent fuel assemblies are kept in storage until they are either removed to permanent storage locations or retrieved for fuel reprocessing.

Even after removal from the core, the spent fuel assemblies continue to generate both heat and fission products, namely gamma and beta radiation, and some neutrons. Therefore, while in storage, means must be provided to cool the spent fuel. Additionally, the spent fuel must be prevented from becoming critical; that is, means must be provided to prevent the spent fuel from propagating a chain-reaction in the storage tank where means for controlling such reaction are not present.

Various types of means have been utilized to prevent the initiation of a chain-reaction. A neutron-absorbing material, such as boron, has been placed between the fuel elements to absorb the excess neutrons produced by the fuel which might otherwise initiate a chain-reaction. Additionally, the containers into which the spent fuel assemblies are placed are generally physically separated from each other so as to prevent the neutrons from one fuel assembly from reacting with the fuel of another fuel assembly. Both of these methods require relatively large distances between adjacent fuel assemblies in the storage container.

One of the problems with the aforementioned storage systems involves the length of time the spent fuel assemblies must remain in storage. At this time, there is no licensed method for the final disposition of the spent fuel, and none which will be available in the near future. Therefore, all the spent fuel which must be removed from the reactor core must be placed in this storage for an indeterminate period of time. A nuclear reactor installation may be required to store, for example, the equivalent of four or five complete cores. The temporary storage of this large number of fuel assemblies within an acceptable facility requires a large financial expenditure.

Providing adequate storage space within an adequate container for the large number of assemblies requires a large volume within the storage container. One method of attempting to reduce the radial space requirements is to use multiple storage levels, wherein the fuel assemblies are stacked one atop the other, with the fuel in any one level being at a common elevation. Although this multiple stacking arrangement may be more practical, large amounts of space in the storage container cannot be utilized for fuel storage because these spaces are occupied by the sections of the fuel assembly duct beyond the ends of the active fuel wherein fuel is not present. What is required is an arrangement wherein the space occupied by the fuel assembly ducts beyond the active fuel is utilized for active fuel storage in an arrangement that prevents the initiation of a chain-reaction.

SUMMARY OF THE INVENTION

The aforementioned problem of the prior art is eliminated by this invention by utilizing the space between the sections of the fuel assembly wherein fuel is not present to store the active fuel section of other fuel assemblies while preventing the initiation of a chain reaction. The storage structure is comprised of a plurality of elongated cells into which the individual spent fuel assemblies are placed. The assemblies, instead of being positioned at one elevation, are staggered within each level, whereby the fuel-containing section of each fuel assembly is located adjacent to the non-fuel-containing section of all the other fuel assemblies radially adjacent to it. This staggering of the fuel assemblies within the cells is accomplished by spacing means placed within the cells. The space requirement between adjacent active fuel sections to prevent the initiation of a chain reaction is present through the non-fuel-containing section of adjacent fuel assemblies.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 3:
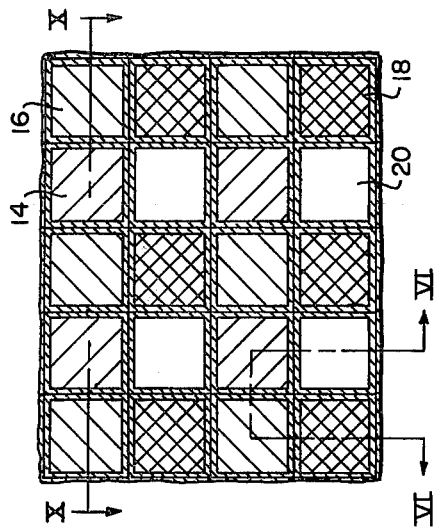
FIGS. 2,3,4 and 5 are modifications of the arrangement of FIG. 1.

Throughout the description which follows, like reference characters indicate like elements in the various Figures of the drawings.

Figure 1:
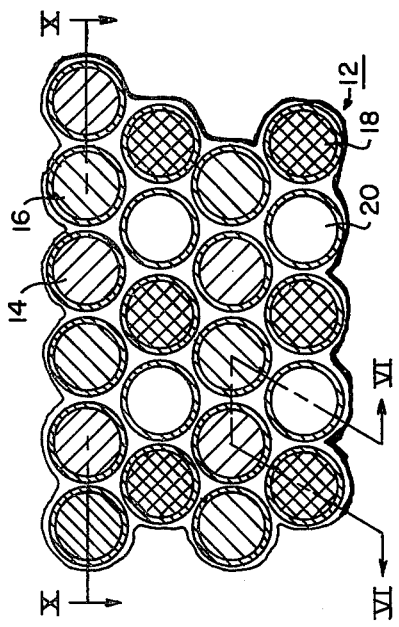
FIG. 1 is a partial diagrammatic plan view of the arrangement of this invention.
Figure 10:
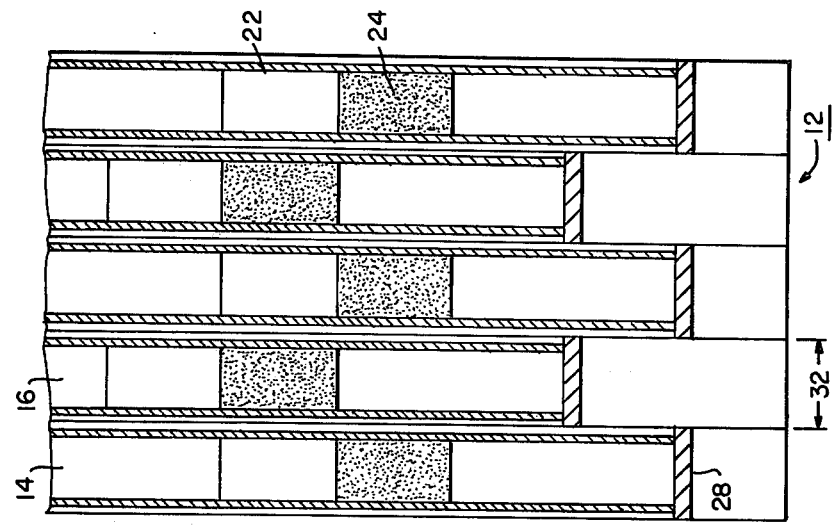
FIG. 10 is a view taken along line X—X of FIGS. 1, 3, or 4.
Figure 6:
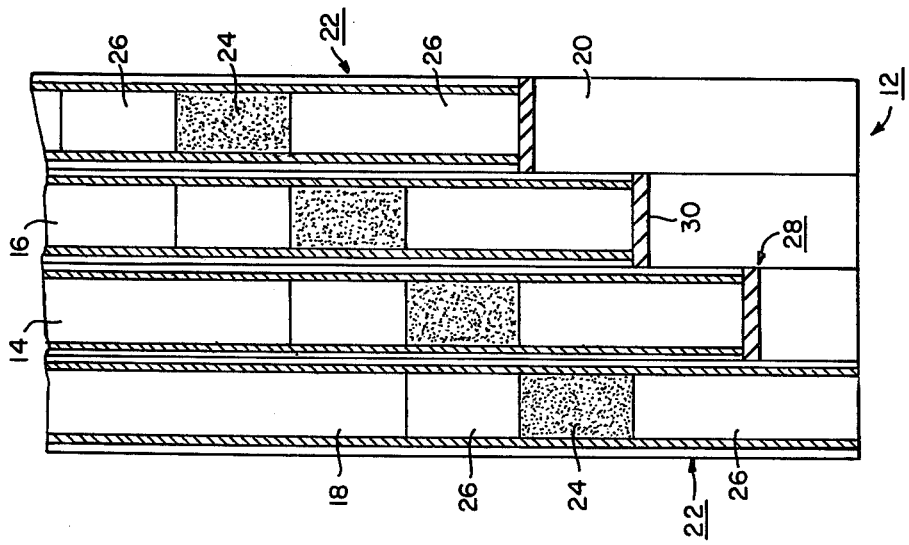
FIG. 6 is a sectional view taken along the line VI—VI of FIGS. 1, 3, or 4.

Referring now more particularly to FIGS. 1, 6, and 10, an elongated, cellular containing structure 12 is comprised of a plurality of elongated cells 14, 16, 18 and 20. The containing structure 12 would, typically, be placed inside a storage tank (not shown). A plurality of elongated nuclear reactor fuel assemblies 22 are positioned within the cells 14, 16, 18 and 20. The fuel assemblies 22 are comprised of at least two different sections along its longitudinal axis. One section, the active section 24, is the section where the nuclear fuel is located. The second section, the inactive section 26, is the section where no fuel is present. As is shown in the drawings, the inactive section 26 is located both vertically above and vertically below the active section 24. Typically, each fuel assembly 22 within a core will have its active section 24 at the same elevation along the fuel assembly longitudinal axis, although this is not a prerequisite to the practice of the present invention. Spacing means 28 are utilized to position the fuel assemblies 22 along the longitudinal axis of each cell 14, 16, 18 and 20. The spacing means 28 position the fuel assemblies 22 such that the active section 24 of each fuel assembly is located radially adjacent to the inactive section 26 of each fuel assembly 22 which radially surrounds the fuel assembly 22.

Referring more particularly to FIG. 1, the individual cells 14, 16, 18 and 20 are positioned adjacent to each other to form a plurality of units comprised of four cells. For compactness, the four cylindrical cells within a unit are positioned within a parallelogrammatical configuration (section line VI—VI traverses through one such cell). Each cell 14, 16, 18 and 20 within a unit contains a fuel assembly 22 which is located at an elevation along the cell longitudinal axis which is different from the vertical position of all the other cells within that unit. This is diagrammatically illustrated in FIG. 1 by utilizing a different cross-hatch pattern to represent a different elevation of fuel assembly 22 within the cell. For example, the cell designated 18 may have the fuel assembly 22 positioned vertically lower than all other fuel assemblies 22 within the unit, the cell designated 14 may have the next lowest elevational fuel assembly 22, the cell designated 16 may have the third lowest elevational fuel assembly 22, and the cell designated 20 may have the fuel assembly within it which has the highest vertical placement.

Figure 7:
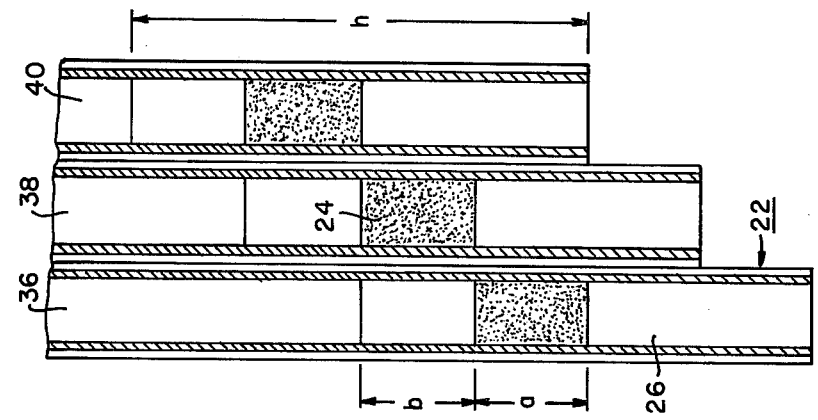
FIG. 7 is a sectional view taken along line VII—VII of FIGS. 2 or 5.

As shown, each fuel assembly 22 within a unit has its active section 24 adjacent to the inactive section 26 of all other fuel assemblies within the unit. For the parallelogrammatical configuration illustrated, this requires placing the fuel assemblies at four distinct and predetermined elevations. This can be accomplished, for example, by means of a spacer plate 30 which is inserted into each cell at predetermined locations. As an alternative to utilizing the plates 30 for longitudinal spacing, the individual cells, as illustrated in FIG. 7, could be axially offset from one another along the cell longitudinal axis within each unit to achieve the required spacing.

Referring now more particularly to FIG. 10, the effect of staggering the elevation of the fuel assemblies 22 with respect to propagation of a chain-reaction can be more easily seen. The radial distance 32 between adjacent active sections 24 is equal to at least one cell diameter. (A distance which, in the prior art, usually was necessary to separate adjacent fuel assemblies). Thus, the same spacing between active fuel sections 24 of fuel assemblies 22 is maintained the same as in the prior art, but this distance 32 is utilized to store an additional fuel assembly 22, but with its active section 24 at a different elevation. Thus, by staggering the elevations of each fuel assembly 22 within a unit, the number of fuel assemblies 22 which may be stored in a given area is greatly increased or conversely, to store a predetermined number of fuel assemblies, the space required is reduced.

Figure 4:
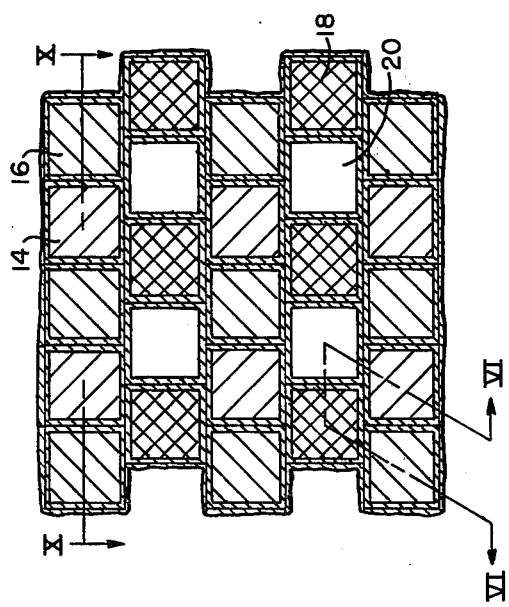

FIGS. 3 and 4 illustrate modifications of the cellular structure 12 shown in FIG. 1. In FIG. 4, the individual cells 14, 16, 18 and 20 are rectangular in configuration, rather than cylindrical. The use of these rectangular cells 14, 16, 18 and 20 may be desirable when the fuel assemblies 22 are rectangular in design, rather than hexagonal or other such similar design. A unit within the configuration shown in FIG. 4 still comprises one each of the four different elevations, and is arranged in a parallelogrammatical configuration. In FIG. 3, the rectangular individual cells 14, 16, 18 and 20 shown in FIG. 4 are also present, but the unit of four cells is arranged in a rectangular configuration. This rectangular unit configuration may be desirable from a manufacturing standpoint. In both the modifications shown in FIGS. 3 and 4, the elevation of the fuel assemblies 22 within each cell 14, 16, 18 and 20 correspond to the elevations as shown in FIG. 1, and the active section 24 of each fuel assembly 22 within a unit will be located adjacent to the inactive section 26 of all the other fuel assemblies 22 within a unit. (Although rectangular, or square, in configuration, the term radial as applied to these cells is used to designate the two axes shown on the plane of the drawing).

Figure 2:
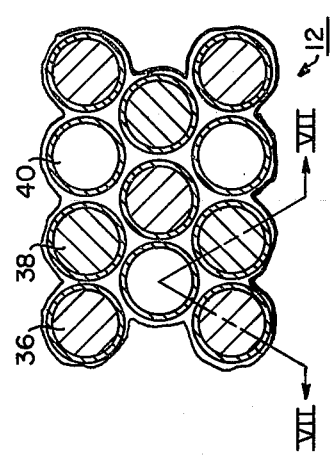
Figure 5:
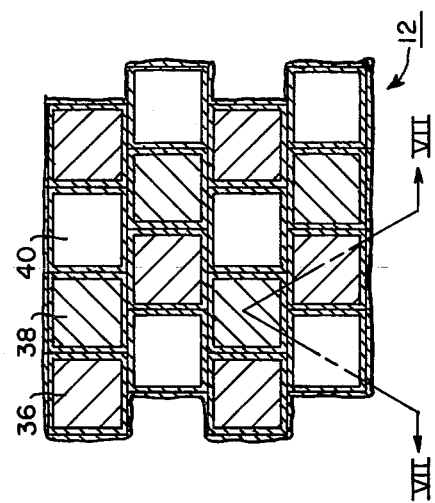

FIGS. 2 and 5 show additional modifications of the structure 12 illustrated in FIG. 1. FIG. 2 illustrates the containing structure 12 as being comprised of cylindrical cells 36, 38 and 40. These cells 36, 38 and 40 are, as distinguished from the parallelogram illustrated in FIG. 1, arranged in a triangular configuration. In such a configuration, the individual fuel assemblies 22 are located at one of three distinct elevations. As previously described, the active sections 24 of the fuel assembly 22 are adjacent to the inactive sections 26 of the two other fuel assemblies 22 within a unit. The use of this triangular configuration for a unit may be desirable to simplify the design of the containing structure 12 and to eliminate the number of spacing means 28 necessary. The cellular structure 12 illustrated in FIG. 5 is similar in operation and design to that as illustrated in FIG. 2, except that the individual cells 36, 38 and 40 are rectangular instead of cylindrical. This, as heretofore mentioned, may be better suited for rectangular fuel assemblies 22.

Figure 8:
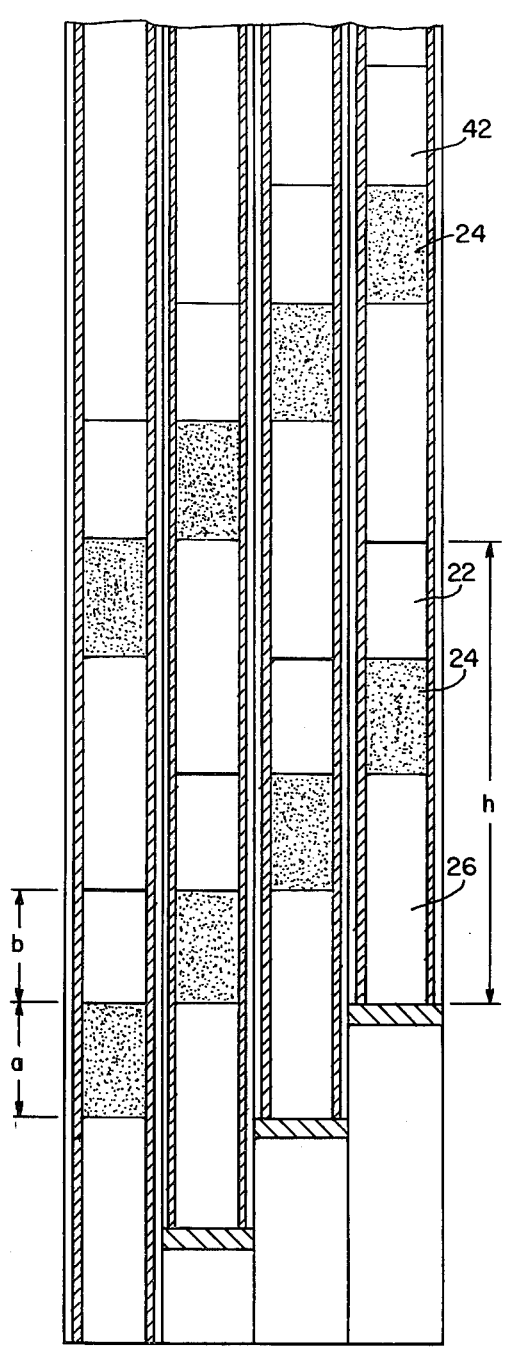
FIG. 8 is a modification of the view of FIG. 6.
Figure 9:
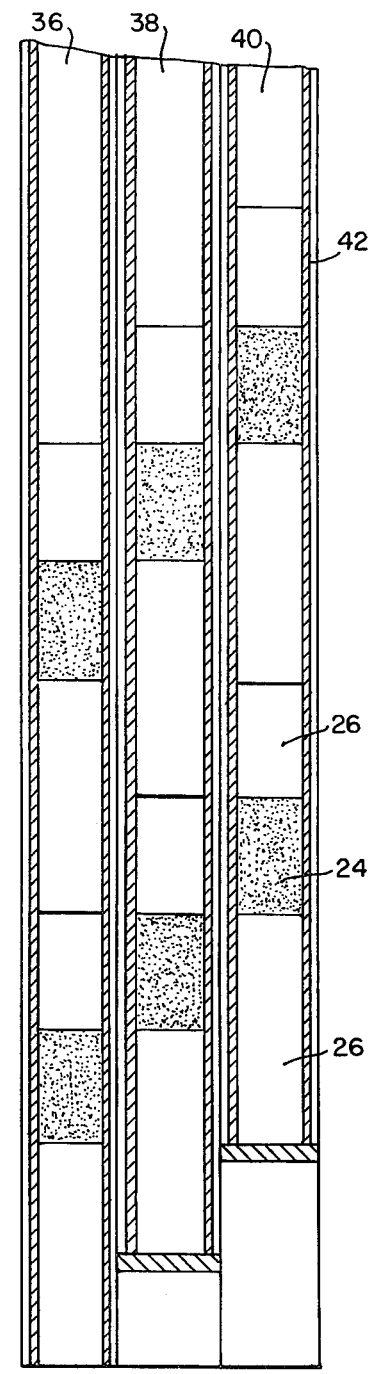
FIG. 9 is a modification of the view shown in FIG. 7.

Referring now to FIGS. 8 and 9, a modification of the view shown in FIGS. 6 and 7, to provide even more storage space within the storage tank, the fuel assemblies 22 may be positioned vertically above one another within the cells. This, for example, could create two different levels of staggered fuel assemblies 22. As illustrated, for the rectangular or parallelogrammatical configurations, in FIG. 8, each of the four elevations originally present would have a second level of fuel assemblies 42 above the first level of fuel assemblies 22. The ability to add a second layer of fuel assemblies depends upon the location of the active fuel section 24 of the assemblies 22, 42. The assemblies can be stacked in a unit of four cells only if the inequality $$h - (a + b) \geq 3a - b,$$

$h$ being the vertical length of the fuel assembly, is satisfied. What this inequality requires is that the inactive section 26 beneath the active section 24 must be vertically longer than the vertical length, $a$, of the three active sections 24 within the cell minus the vertical length, $b$, of the inactive section above the active section 24. For the triangular configuration shown in FIG. 9, the inequality is $$h - (a + b) \geq 2a - b$$

This inequality conforms to the fact that only three cells 36, 38 and 40 are within a unit, and the length of the lower inactive section 26 need only extend greater than the vertical length, $a$, of two active sections 24 minus the inactive section, $b$, 26 above the active section.

Thus, the invention discloses a compact fuel storage arrangement which provides the necessary spacing between adjacent fuel assemblies to prohibit the propagation of a fission chain reaction, and which increases the number of fuel assemblies which may be stored within a given volume.

I claim as my invention:

1. A storage arrangement for elongated nuclear reactor fuel assemblies, each of said elongated fuel assemblies having an active section along its longitudinal axis wherein fuel is located and an inactive section along its longitudinal axis wherein fuel is absent, said storage arrangement comprising:

an elongated, cellular structure comprised of a plurality of elongated cells positioned radially adjacent to each other, each of said cells being adapted to receive one of said fuel assemblies, said fuel assemblies being positioned within said cells; and means for spacing said fuel assemblies within said structure along the longitudinal axis of said cells, said means for spacing said fuel assemblies positioning said fuel assemblies at predetermined locations along said longitudinal axis such that said active section of each fuel assembly is located adjacent to said inactive section of each fuel assembly radially adjacent to it.

2. The arrangement according to claim 1 wherein said cells are positioned adjacent to each other to form a plurality of units, each of said units comprising four cells in a parallelogrammatical configuration.

3. The arrangement according to claim 2 wherein said active section of each fuel assembly is located at the same elevation along the fuel assembly longitudinal axis, and said means for spacing said fuel assemblies positions said fuel assemblies at one of four predetermined elevations along said cell longitudinal axis.

4. The arrangement according to claim 1 wherein said cells are positioned adjacent to each other to form a plurality of units, each of said units comprising three cells in a triangular configuration.

5. The arrangement according to claim 4 wherein said active section of each fuel assembly is located at the same elevation along the fuel assembly longitudinal axis, and said means for spacing said fuel assemblies positions said fuel assemblies at one of three predetermined elevations along said cell longitudinal axis.

6. The arrangement according to claim 1 wherein said cells are positioned adjacent to each other to form a plurality of units, each of said units comprising four cells in a rectangular configuration.

7. The arrangement according to claim 6 wherein said active section of each fuel assembly is located at the same elevation along the fuel assembly longitudinal axis, and said means for spacing said fuel assemblies positions said fuel assemblies at one of four predetermined elevations along said cell longitudinal axis.

8. The arrangement according to claim 1 wherein one of said fuel assemblies is positioned within one of said cells vertically above another of said fuel assemblies.

9. The arrangement according to claim 1 wherein said cells are cylindrical.

10. The arrangement according to claim 1 wherein said cells are rectangular.

11. The arrangement according to claim 1 wherein said means for spacing said fuel assemblies comprise spacer plates positioned within said cells at predetermined locations along said cell longitudinal axis.

12. The arrangement according to claim 1 wherein said means for spacing said fuel assemblies comprise said cells radially adjacent to each other being located at predetermined positions axially offset from each other.

* * * * *